Patented Apr. 22, 1947

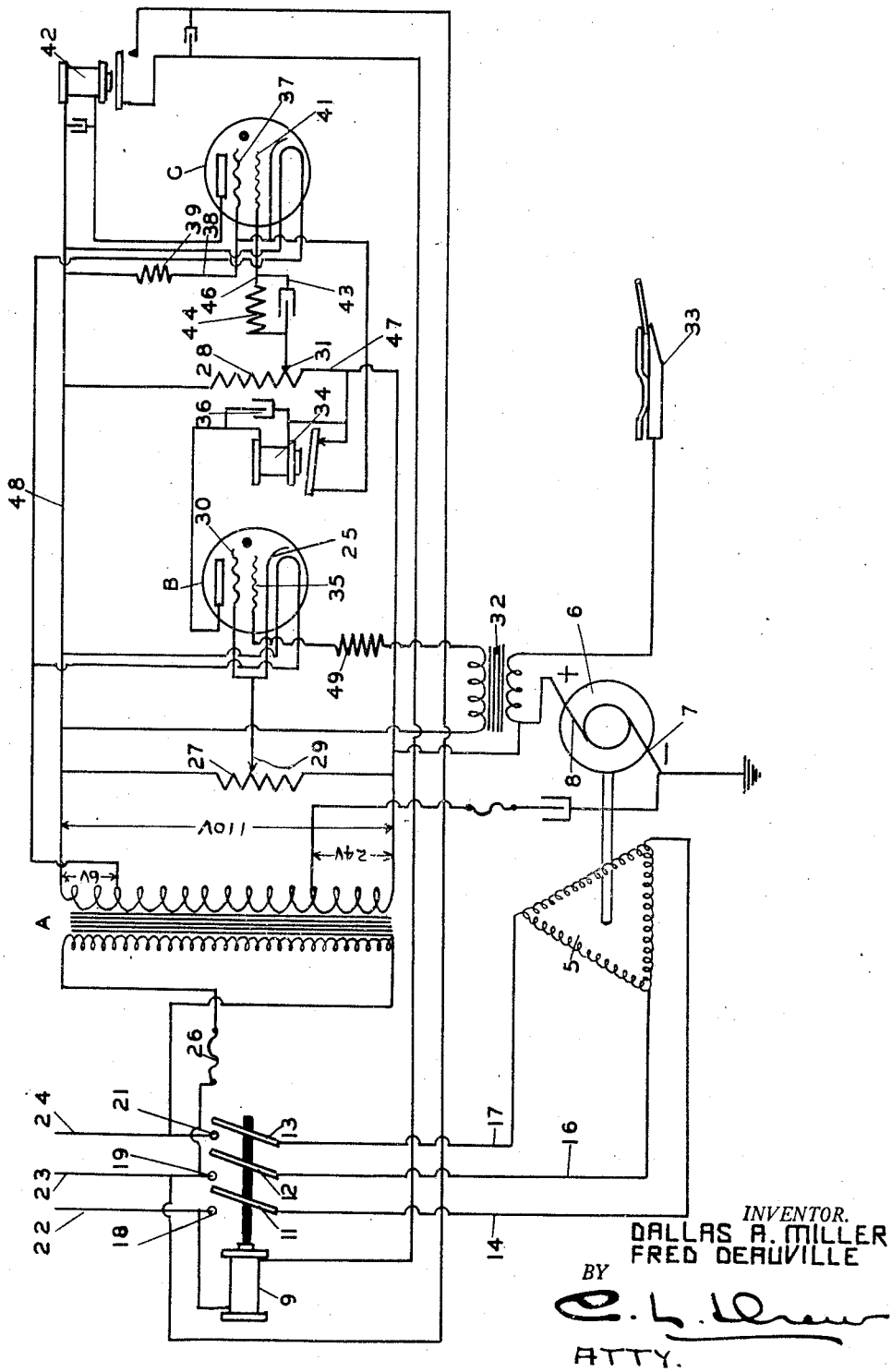

2,419,276

UNITED STATES PATENT OFFICE 2,419,276

REMOTE CONTROL MEANS FOR ELECTRICAL CIRCUITS

Dallas A. Miller, Lagunitas, and Fred Deauville, San Francisco, Calif.

Application May 27, 1944, Serial No. 537,630

2 Claims. (Cl. 172—239)

This invention relates to improvements in remote control means for electrical circuits.

The principal object is to control the starting and stopping of a remotely located motor, or similar electrical apparatus.

A further object is to definitely control a predetermined running time of a motor, after the starting and holding circuit is broken.

A further object is to produce a device which may be attached to any standard equipment such as a welding machine without materially altering its construction.

A further object is to construct a device which will not interfere in any way with the normal operation of the circuit to which it is attached.

A still further object is to produce a device which is economical to manufacture and one which is not subject to frequent breakdowns and one which can be easily serviced when necessary.

A still further object is to produce a device which will not interfere with the normal operating of a welding machine should the device itself fail to operate.

Other objects and advantages will be apparent during the course of the following description.

In the accompanying drawing we have shown a schematic diagram of our circuit as the same would be attached to a standard welding machine circuit.

In a welding process a welding machine is employed which usually consists of a portable motor and generator arrangement, the motor driving the generator, which in turn delivers a low voltage and a high amperage current through a cable to a stinger, which stinger is a tool used by the welder and serves to hold the welding rod. When this rod is brought into contact with the work an electric arc is caused and the rod, in turn, melts and fuses with the work, the return circuit for the current being through the work and a ground to the generator.

When the motor is turned on a relay having a holding coil is energized and this coil, in turn, moves switch-blades into engagement with contacts to complete a circuit and holds the blades closed until the holding coil circuit is manually broken; therefore, a welding machine, after once being turned on, may be left running for long periods, even while the machine is not being used by the welder, for the reason that the machine is usually located a long distance away from the work and may be reached only by a very tortuous route.

The constant running of the welding machine when not in use consumes a large amount of current and causes a considerable amount of wear and tear on the machine, which machines are most of the time exposed to all kinds of weather and wind-blown dirt. We, therefore, have designed a simple remote control circuit that can be attached to a standard welding machine circuit without in any way interfering with the proper functioning of the welding machine.

Our circuit is such that by using a pair of electronic tubes and by controlling the functioning of these tubes, we can actuate the motor switches and holding coil to start the welding machine, holding the machine running as long as welding is taking place and for a predetermined definite period after the welding has ceased; or, if welding commences again during the delayed running period, the device will still hold the contacts in running position until the welding has been completed and for a short definite interval thereafter.

The delay period is to allow the welder to insert new welding rods in the stinger or to allow for movement to a new welding position, or for any other normal delay which usually occurs in a welding sequence before the machine shuts down; otherwise, every time a welder stopped welding the machine would stop and this would impose so many stops and starts that the power factor would be lowered, besides causing considerable extra wear and tear on the machine.

In the accompanying drawing, wherein for the purpose of illustration is shown a preferred embodiment of our invention, the numeral 5 designates a welding motor and the numeral 6 a welding generator having a negative brush 7 and a positive brush 8. At 9 we have shown a switch coil hereinafter referred to as a holding coil. This coil has an armature that is physically connected to the blades 11, 12 and 13, or a switch hereinafter called the starting switch. The blades 11, 12 and 13 are electrically connected by wires 14, 16 and 17 and respectively to the motor 5. The blades 11, 12 and 13 are adapted to engage contacts 18, 19 and 21, respectively, which are, in turn, connected to the line wires 22, 23 and 24 respectively, of a 3-phase, 440 volt line. The wires 23 and 24 are connected to the primary of a transformer A, one side of the line being fused as at 26. The secondary of this transformer A is so wound as to provide 110 volts across its terminals and also taps are taken off to provide six volts and 24 volts, the 6-volt taps furnishing the current to the heaters of two electronic tubes designated at B and C. The 24-volt taps are connected to the brushes 7 and 8 of the generator 6 and fused, a capacitor being placed in one side of the line, the capacitor serving to prevent any D. C. current from reaching the secondary of the transformer A and burning it out, the fuse protecting the transformer should the capacitor break down.

Mounted in parallel across the 110-volt taps of the transformer A are potentiometers 27 and 28, having sliders 29 and 31 respectively, the slider 29 being connected to the grid 30, and cathode 25 of the tube B. The control grid 35 of the tube B is connected through a resistance 49 to the secondary of a small transformer 32, the opposite side of which is connected to one side of the 110 volt line from the transformer A. The primary of the transformer 32 is connected to the positive brush 8 of the generator and to the stinger 33. As the brush 7 is negative and grounded, a circuit will be completed when the stinger and its rod are brought into contact with grounded work.

The plate of the tube B is connected to one side of a relay 34, the other side being connected to the transformer A, and a capacitor 36 is connected across the relay coil to prevent chattering of the armature. The armature of this relay 34 normally maintains a closed circuit between one side of the transformer A to the cathode and grid 37 of tube C, thence by wire 38, through resistance 39, back to the other side of the transformer A.

The slider 31 is connected through a capacitor and resistance connected in parallel to the control grid 41 of the tube C. The plate of this tube C is connected to one side of a relay 42, and the other side of the relay is connected to one side of the 110-volt line, a small capacitor being connected across the relay winding to prevent chattering. The armature of this relay is normally held in open position, but when de-energized, closes a circuit from wire 22, through the holding coil 9, thence by return wire to wire 23.

A small capacitor is placed across the armature and its contact to prevent arcing. The result of this hookup is that when the same is attached to a welding machine, and the operator touches his stinger or rod to the grounded work, 24 volts of current will flow from the 24-volt part of the transformer A through the primary of transformer 32. This will induce voltage on the control grid 35, which, added to the grid voltage on grid 30 of tube B, brings the voltage high enough to be above the cut-off point of the tube, thereby letting current flow from the plate of the tube to the cathode, which, in turn, will energize relay 34 to open the normally closed circuit between one side of the 110-volt line and the cathode of tube C. This cuts off the flow of current through the relay 42 to the plate of tube C and thence to the cathode, this stopping of the flow of current through the tube C and relay 42 de-energizing the relay, which releases its armature and closes the contacts to start the motor, through the actuation of the holding coil 9 and its attached switch-blades. The slider 31 is a variable time delay control and will permit current to pass only when the relay contacts 34 are closed.

When a welder has terminated his weld there is no current between the stinger and the work and therefore, no induced voltage in transformer 32, so the grid of tube B shuts off its flow of current from the plate to the cathode, and relay 34 becomes deenergized, closing contacts which complete the circuit to the cathode of tube C, but current cannot flow through tube C until a time delay caused by a negative charge in capacitor 43 has dissipated through resistance 44. When this stored-up negative charge has dissipated, current will flow through tube C, energizing relay 42, which opens the contacts, thereby de-energizing the holding coil 9 and causing the motor to stop.

The negative charge in capacitor 43 has been obtained through what is known as grid rectification. The voltage across 44 is caused by current flowing from slider 31 to 46. Since slider 31 is positive and 46 is negative, 43 charges up to its crest voltage. Since current cannot flow from the cathode to the grid at the opposite half-cycle, 43 remains at its crest voltage as long as relay 34 contacts are open. When 47 is positive current flows through 28 to slider 31, through 44 to 46, to cathode, through 39 and to line 48, which is negative in respect to 47. This is the half-cycle when 43 gets its charge. 49 is a grid protecting resistor.

The time delay may be changed by different settings of the potentiometer 28.

The apparatus operates in the following manner: The connection of the power line to the apparatus by a conventional plug effects an energization of the transformer A and the application of potentials to the elements of the thermionic tubes B and C and their units energized from the secondary of the transformer. Tube B is normally non-conducting, while tube C is normally conducting, and relay coil 42 is in its energized state to maintain the armature thereof attracted and thereby to maintain the circuit including the winding of the holding coil 9, in open position. This condition obtains until the welding operator completes the welding circuit by applying the stinger 33 to the work which energizes the primary winding of transformer 32 to induce currents in the secondary thereof, which unblocks tube B by the control action exercised by the grid 35 of that tube. The operation of the tube B energizes relay 34 which attracts its armature and interrupts the connection of the cathode of tube C to the lower terminal of the secondary of transformer A. This interruption of the conductive circuit through tube C effects an immediate de-energization of relay 42, the armature of which drops and completes the circuit of the coil 9 from the power supply to cause a closure of the main switch which energizes the windings of the induction motor 5. This energization is substantially instantaneous with the application of the stinger 33 to the work. The generator then builds up its voltage and the welding operation is performed in the usual manner.

When the operator removes the stinger from the work, transformer 32 is disabled and grid 35 effects a blocking of the tube. Relay 34 permits its armature to drop to complete the connection of the cathode of tube C to the lower end of the secondary of transformer A. However, tube C does not become immediately conducting, and the length of time elapsing before the same is rendered conductive depends upon the setting of the slider 29 on potentiometer 28 and the values of the condenser and resistance 44 in the grid leak circuit. The application of the stinger 33 to the work following short periods of interruption, will reinstate the conductivity of tube B and the operation of relay 34 to interrupt the connection of the cathode of tube C to the secondary of transformer A. It is only after a comparatively lengthy time has elapsed, such as 1, 2 or 3 minutes, that the tube C is rendered conductive after the blocking charge on grid 41 has passed off, so that relay 42 is energized to attract its armature and to open the circuit of the holding coil 9 of the main switch. The opening of switch armatures 11, 12 and 13 effects a deenergization of the starting motor 5.

The cycle of operations explained above may be repeated any time the stinger 33 is reapplied to the work to complete the welding circuit.

It will thus be seen that by constructing a control unit as shown in the above description, we can accomplish all of the objects referred to. It is understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:

1. In combination with a motor generator set, a switch therefor, and a holding coil for closing and holding said switch closed when said set is running off a line transformer, a pair of potentiometers connected in parallel with said transformer, a pair of electronic tubes connected across said transformer, a relay associated with each of said tubes, and electrically connected thereto, each of said potentiometers having a slider, one of said sliders being connected to the cathode of one of said tubes, and the slider of the other potentiometer being connected to the control grid of the other of said tubes, and means of imposing an increased potential on the control grid of the first tube to cause current to flow therethrough, whereby its relay will cause a circuit flow to the second tube to interrupt the flow of current therethrough to release its relay, said means including a transformer in the output circuit of said generator.

2. An apparatus for controlling a welding circuit embodying a motor-generator set comprising a magnetically operated switch for energizing the driving motor of said set, electronically controlled means for normally maintaining said switch in open position, means responsive to the completion of the welding circuit for instantaneously disabling said means to operate said switch and thereby to initiate the start of said motor, and delayed action means effective at a predetermined period of time following the interruption of the welding circuit to actuate said electronically controlled means to effect a deenergization of said switch and a consequent stoppage of said driving motor.

DALLAS A. MILLER.
FRED DEAUVILLE.

REFERENCES CITED

The following references are of record in the file of this patent:

UNITED STATES PATENTS

| Number | Name | Date |
| --- | --- | --- |
| 2,089,636 | Adair | Aug. 10, 1937 |
| 2,171,347 | Schneider | Aug. 29, 1939 |
| 2,306,237 | Wolfner | Dec. 22, 1942 |
| 2,023,051 | Jones | Dec. 3, 1935 |
| 2,135,045 | Blankenbuehler | Nov. 1, 1938 |
| 2,135,046 | Blankenbuehler | Nov. 1, 1938 |
| 2,170,861 | Hobart | Aug. 29, 1939 |
| 2,237,894 | Tyrner | Apr. 8, 1941 |
| 2,328,596 | Winsor | Sept. 7, 1943 |